United States Patent Office 3,745,062
Patented July 10, 1973

3,745,062
CROSSLINKED AROMATIC POLYMERS HAVING DIRECT AROMATIC NUCLEI TO AROMATIC NUCLEI LINKAGES
Alan J. Neale and Terence J. Rawlings, Llangollen, Wales, assignors to Monsanto Chemicals Limited, London, England
No Drawing. Application July 9, 1968, Ser. No. 743,328, which is a continuation-in-part of application Ser. No. 433,474, Feb. 17, 1965. Divided and this application Dec. 21, 1970, Ser. No. 100,406
Claims priority, application Great Britain, Feb. 20, 1964, 7,100/64; July 10, 1967, 31,589/67
Int. Cl. B32b *13/04, 19/08*
U.S. Cl. 161—205                                       8 Claims

ABSTRACT OF THE DISCLOSURE

Disclosed herein are crosslinked insoluble, infusible, thermally stable polyphenylene resins comprising a plurality of recurring polyvalent aromatic radicals, which are characterized by direct aromatic nuclei to aromatic nuclei linkages, which resins are prepared by the thermal condensation reaction of an aromatic sulfonyl halide and an aromatic compound containing replaceable nuclear hydrogen atoms.

The aromatic radicals are single ring or fused ring carbocyclic or heterocyclic moieties and include those compounds wherein the aromatic radicals are joined by a divalent linking radical.

CROSS-REFERENCES TO RELATED APPLICATIONS

This application is a divisional application of U.S. patent application 743,328, filed July 9, 1968 which issued as U.S. Pat. 3,585,163 on June 15, 1971. U.S. patent application 743,328 is a continuation-in-part of U.S. patent application Ser. No. 433,474, filed Feb. 17, 1965, which in turn, is a convention application of British patent application 7,100/64, filed Feb. 20, 1964, now British Pat. 1,037,111. This application claims the right to the priority date of British patent application 7,100/64, filed Feb. 20, 1964 (British Pat. 1,037,111) and British patent application No. 31,589/67, filed July 10, 1967.

BACKGROUND OF THE INVENTION

Field of the invention

This invention relates to novel crosslinked aromatic polymeric compositions. More particularly, this invention relates to crosslinked, insoluble, infusible polyphenylene resins comprising a plurality of recurring polyvalent aromatic radicals which are characterized by direct aromatic nuclei to aromatic nuclei linkages and which are prepared by the thermal condensation reaction of an aromatic sulfonyl halide and an aromatic compound containing replaceable nuclear hydrogen atoms.

In modern technology there is a demand for materials having high mechanical strengths and high resistance to thermal and oxidative deterioration when subjected to elevated temperatures. A new class of materials having such properties is provided by the present invention.

Description of the prior art

Polyphenylenes can be defined as polynuclear aromatic polymers where the recurring aromatic nuclei are derived from carbocyclic aromatic compounds such as benzene, biphenyl, diphenyl, terphenyl, naphthalene, binaphthyl, anthracene, etc.

These materials have been reported by Marvel et al. in Journal of the American Chemical Society, volume 81, pg. 448 (1959) and by Kovacic et al. in the Journal of the American Chemical Society, volume 85, p. 458 (1963) and by numerous other researchers.

In the work of Marvel et al. polyphenylenes are prepared by the polymerization of 1,3-cyclohexadiene with Ziegler-Natta catalysts followed by halogenation and subsequent dehydrohalogenation. The para-polymers which are obtained by this procedure are infusible and contain residual halogen and usually some free carbon resulting from pyrolysis. In the work of Kovacic, polyphenylenes are obtained from the cationic oxidative polymerization of benzene. These polymers are also reported to be para-oriented, and, as is typical of the para-polyphenylenes, are infusible and completely intractable. In view of this infusibility and insolubility, the para-polyphenylenes have little or no utility as impregnating resins or as surface coatings.

Other polyphenylenes are known in the prior art which are graphically described as having the characteristics of red brick dust. These materials are heat stable but are intractible, infusible material with little mechanical strength and little utility.

The polyphenylene resins known in the prior art are made by processes which are not widely adapted to the commercial preparation of polyphenylene resins. These processes are based on different organic synthesis routes such as the Wurtz-Fittig reaction [Edwards, A. G. and Goldfinger, G. J., Polymer Sci., 16, 589 (1955)], the Grignard reaction and the Ullmann reaction. These diverse reactions which are suitable for the laboratory preparation of polyphenylenes may be generally undesirable for large scale commercial preparation of polyphenylenes because of the commercial impracticality of the process or because the products obtained are characterized by low molecular weight, poor yields, low mechanical strength or other properties which detract from their utility as impregnating or coating resins.

A need exists in the art for crosslinked, insoluble, infusible polyphenylene resins having high mechanical strengths and high resistance to thermal and oxidative deterioration when subject to elevated temperatuures.

A further need exists in the art for soluble, fusible, polyphenylene resins which can be used to coat or impregnate substrates and then can be further polymerized in situ to give crosslinked insoluble, infusible polymeric compositions.

SUMMARY OF THE INVENTION

The present invention relates to crosslinked, insoluble, infusible polyphenylene resins comprising a plurality of recurring polyvalent aromatic radicals, which are characterized by direct aromatic nuclei to aromatic nuclei linkages which resins are prepared by the thermal condensation reaction of an aromatic sulfonyl halide and an aromatic compound containing replaceable nuclear hydrogen atoms. The recurring aromatic radicals may be single ring or fused ring carbocyclic or heterocyclic moieties and include those compounds wherein the aromatic radicals are joined by a divalent linking radical.

The present invention provides a solution for the problems faced in the prior art by providing crosslinked, insoluble, infusible polyphenylene resins having high mechanical strength and high resistance to thermal and oxidative deterioration when subject to elevated temperatures and processes for preparing these resins, and for molded or shaped articles prepared from a reinforcing element and the aforementioned polyphenylene resins.

The present invention also fulfills a definite need in the prior art by providing a process for the preparation of a soluble, fusible polyphenylene prepolymer which is further polymerized into a crosslinked infusible, insoluble polyphenylene.

It is an object of this invention to provide crosslinked, insoluble, infusible polyphenylene resins.

It is another object of this invention to provide shaped articles and laminates utilizing the aforementioned crosslinked insoluble, infusible polyphenylene resins.

It is another object of this invention to provide soluble, fusible polyphenylene prepolymers.

It is another object of this invention to provide a process for the preparation of crosslinked insoluble, infusible polyphenylene resins.

DESCRIPTION OF THE PREFERRED EMBODIMENTS

The foregoing and other objects are obtained by a crosslinked, insoluble, infusible polyphenylene resin wherein the recurring units in the polymer are characterized by direct aromatic nuclei to aromatic nuclei linkages, which polyphenylene resin is prepared by the thermal condensation reaction of (1) an aromatic sulfonyl halide having at least two sulfonyl halide groups per molecule and at least one aromatic nucleus and
(2) an aromatic compound having at least three replaceable hydrogens per molecule and at least one aromatic nucleus wherein the aromatic nuclei are selected from the group consisting of (A) carbocyclic aromatic nuclei selected from the group consisting of benzene, anthracene, naphthalene, biphenyl and binaphthyl;
(B) heterocyclic aromatic nuclei selected from the group consisting of dibenzofuran and dibenzothiophene; and
(C) bridged aromatic nuclei of the following general formula $$(R_1—X—R_1)$$

wherein $R_1$ is selected from groups (A) and (B) above and wherein X is a divalent linking radical selected from the group consisting of

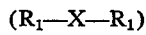

wherein the ratio of the number of units in the final polymeric product derived from the aromatic compound to the number of units derived from the aromatic sulfonyl halide is not more than the number of sulfonyl halide groups in the aromatic sulfonyl halide; and wherein the thermal condensation reaction is carried out at a temperature in the range of from 175° C. to 475° C.

The aromatic sulfonyl halides used in the present invention are compounds containing at least two sulfonyl halide groups and one or more aromatic nuclei per molecule. Where the compound contains more than one nucleus, the sulfonyl halide groups can be linked to carbon atoms of the same nucleus or to carbon atoms of different nuclei.

The nucleus or nuclei in the sulfonyl halide are independently selected from the following groups:

(A) carbocyclic, such as for example benzene, anthracene, naphthalene, biphenyl, binaphthyl, etc.,
(B) heterocyclic nuclei such as for example of dibenzothiophene or dibenzofuran; or
(C) bridged aromatic nuclei of the following general formula:

$$(R_1—X—R_1)$$

wherein $R_1$ is independently selected from groups (A) and (B) above and wherein X is a divalent linking radical selected from the group consisting of

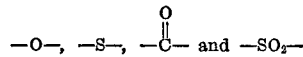

The nucleus or nuclei of the aromatic sulfonyl halide can contain one or more halogen substituents preferably fluorine or chlorine in addition to the sulfonyl halide groups provided that at least two sulfonyl halide groups are present.

The preferred aromatic sulfonyl halides are the aromatic carbocyclic disulfonyl halides and trisulfonyl halides, wherein the aromatic carbocycliic nucleus contains no substituents except for the sulfonyl halide groups.

The preferred sulfonyl halide groups used are the sulfonyl chlorides or sulfonyl bromides, and of these the chlorides are especially preferred.

The preferred sulfonyl halides used in the present invention include the di- and tri-sulfonyl halide derivatives of benzene, anthracene, naphthalene, biphenyl, binaphthyl, dibenzothiophene and dibenzofuran; the di- and tri-sulfonyl halide derivatives of aromatic compounds containing a sequence of from 2 to 4 benzene, anthracene, naphthalene, biphenyl, binaphthyl, dibenzothiophene or dibenzofuran nuclei linked by direct aromatic nuclei to aromatic nuclei linkages; the di- and tri-sulfonyl halide derivatives of aryl ethers; the di- and tri-sulfonyl halide derivatives of aryl sulfides; and the di- and tri-sulfonyl halide derivatives of benzophenone and diphenylsulfone.

Specific examples of the preferred aromatic sulfonyl halides used in the present invention include:

benzene-1,3-disulfonyl chloride;
monochlorobenzene-1,3-disulfonyl chloride;
benzene-1,3-disulfonyl bromide;
2,4,5,6-tetrachlorobenzene-1,3-disulfonyl chloride;
naphthalene-1,5-disulfonyl chloride;
naphthalene-2,7-disulfonyl chloride;
naphthalene-1,3,6-trisulfonyl chloride;
diphenyl-4,4'-disulfonyl chloride;
diphenyl ether-4,4'-disulfonyl chloride;
diphenylsulfide-4,4'-disulfonyl chloride;
dibenzothiophene-2,8-disulfonyl chloride;
dibenzofuran-3,7-disulfonyl chloride;
diphenyl-2,2'-sulfonyl;
4,4'-disulfonyl chloride;
diphenyl-2,2'-sulfonyl 4,4'-disulfonyl chloride; and
benzophenone 4,4'-disulfonyl chloride An examples of a purely hetero-aromatic sulfonyl halide that is used is pyridine-3,5-disulfonyl chloride.

The especially preferred aromatic sulfonyl halides are benzene disulfonyl chloride and benzene trisulfonyl chloride.

The second component of the polymer-forming reaction mixture of the present invention are aromatic compounds having at least three (3) replaceable nuclear hydrogen atoms and at least one aromatic nuclei per molecule. The aromatic nucleus or nuclei are independently selected from the following groups:

(A) carbocyclic, such as for example benzene, anthracene, naphthalene, biphenyl, binaphthyl, etc.,
(B) heterocyclic nuclei such as for example dibenzothiophene or dibenzofuran; or
(C) bridged aromatic nuclei of the following general formula:

$$(R_1—X—R_1)$$

wherein $R_1$ is independently selected from groups (A) and (B) above and wherein X is a divalent linking radical selected from the group consisting of

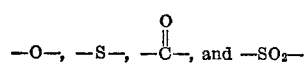

The aromatic compound should be free of functional groups that would react with the sulfonyl halide groups in the aromatic sulfonyl halides, and provided that at least three replaceable hydrogen atoms are present, the aromatic compound can contain one or more halogen substituents, preferably fluorine or chlorine. Preferred aromatic compounds are however those that are unsubstituted or those in which at least half of the nuclear carbon atoms carry hydrogen while the remainder carry fluorine or chlorine.

Examples of the preferred aromatic compounds that are used in the present invention include: benzene; chlorobenzene; dichlorophenyl; anthrocene; dichloroanthracene; naphthalene; trichloronaphthalene; biphenyl; 2-chloro - 2' - fluor-biphenyl; binaphthyl; dibenzothiophene; dibenzofuran; 4,4'-diphenyl ether; 4,4'-diphenylsulfonyl; diphenoxyterphenyl; diphenoxyquaterphenyl; bis-phenoxybiphenylyl ether; bis-phenylthio-biphenylyl ether; bis-(dibenzothienyl)benzene; bis - dibenzofuranyl - diphenyl ether; benzophenone.

Also included are soluble, fusible polyaryls such as polyphenyls; polyaryl ethers; polyaryl sulfides; dibenzothienyl polyaryls; and polyaryl dibenzothiophenes.

Examples of the preferred polyaryl compounds that are used in the practice of the present invention include soluble, fusible polyphenyls containing up to 200 benzene nuclei such as terphenyl; binaphthyl; quinquephenyl; sexiphenyl; septaphenyl; octaphenyl; octadecaphenyl; etc.

Many of these compounds can be made by the arylation process described in British Pat. 919,088, essentially corresponding to copending U.S. application Ser. No. 150,120, filed Nov. 6, 1961, now U.S. 3,231,629. Thus, for example, sexiphenyl and diphenoxyquaterphenyl can be obtained by the reaction of biphenyl-4,4'-disulfonyl chloride with biphenyl and diphenyl ether respectively; bis(phenoxy-biphenylyl)ether and bis(phenylthiobiphenylyl)ether can be obtained by the reaction of diphenyl ether-4,4'-disulfonyl chloride with diphenyl ether and diphenyl sulfide respectively; and bis(dibenzothienyl) benzene can be obtained by action of benzene-disulfonyl chloride on dibenzothiophene.

The quantities of the respective reactants used to prepare the polymers of the present invention are such that in the final polymeric product there is up to one mol of the aromatic compound for each mol of sulfonyl halide groups that were present in the aromatic sulfonyl halide reactant. In other words, when starting with an aromatic disulfonyl halide the final polymeric product would contain up to two mols of the aromatic compound per mol of the aromatic disulfonyl halide residue. When starting with an aromatic trisulfonyl halide the final polymeric product would contain up to three mols of the aromatic compound per mol of the aromatic trisulfonyl halide residue.

In the polymerization reaction the preferred ratios of sulfonyl halide to aromatic compound used vary according to the molecular weight of the aromatic compound. Where the latter has a relatively low molecular weight, being, for instance, a material containing not more than 8 aromatic nuclei, the preferred ratios are generally within the range 1 to 3 molar proportions of the sulfonyl halide to 1 molar proportion of the aromatic compound. Where the aromatic compound is a material of higher molecular weight, for example a polymer of the invention as referred to above, and which may contain up to for example 40 aromatic nuclei, somewhat higher molar proportions of sulfonyl halide can be used, for instance up to 5 mols of sulfonyl halide per mol of aromatic compound.

The reaction temperatures used in the practice of the present invention should not, of course, be above the decomposition temperature of the polymers formed. In many instances decomposition of the polymer sets in at about 500° C., so that the upper limit for the reaction temperature is usually about 475° C. In the practice of this invention, reaction temperatures in the range of from 175° to about 475° C. can be used. The preferred reaction temperatures are those in the range of from 300° to 400° C. and the especially preferred reaction temperatures are in the range of 305° to 330° C.

Several procedures are available for operating the process for the production of the aromatic polymers. For example, the total quantities of the reactants to be used can be mixed initially; the sulfonyl halide can be added gradually or in stages to the aromatic compound; or a mixture of the sulfonyl halide and a portion of the aromatic compound can be added gradually to the remainder of the aromatic compound.

As will be illustrated below, the crosslinked, insoluble, infusible final polymeric product can be prepared in a one step operation or an intermediate soluble, fusible prepolymer, which can be further reacted to form a crosslinked, insoluble, infusible polymer, can be isolated. The isolation of one or more intermediate polymers is generally straightforward, especially when the sulfonyl halide is added in stages, should such isolation be desired.

At a given reaction temperature, the properties of the polymers vary with the duration of heating and the proportions of the reactants. During the early and intermediate stages of the polymerization process, the polymeric products are readily soluble in such solvents as chloroform, trichloroethylene, chlorobenzene or xylene, and on cooling are viscous liquids or solids of low softening points. Such polymeric products are conveniently termed intermediate polymers or prepolymers as is mentioned. Using the preferred proportions of reactants referred to above, the intermediate polymers or prepolymers generally remain substantially completely soluble up to a relatively high degree of molecular complexity, corresponding in many instances to the evolution of 50 percent or more of the theoretical quantities of gases, i.e., sulfur dioxide and halogen halide. As the polymerization proceeds, however, there is formed an insoluble fraction the proportion of which progressively increases and the softening point of the polymer increases correspondingly.

The ultimate polymers that are obtained by heating either (1) the aromatic sulfonyl halide and the aromatic compound or (2) the prepolymer and an aromatic sulfonyl halide for a sufficiently long time so that substantially all of the theoretical quantities of sulfur dioxide and hydrogen halide are evolved are highly branched crosslinked, insoluble, infusible solids. These materials do not melt at any temperature, and are stable for prolonged periods at temperatures of 250° C. or higher.

The properties of a polymer produced from an aromatic disulfonyl halide as the major aromatic sulfonyl halide reactant can be modified by including in the reaction mixture a proportion of an aromatic sulfonyl halide containing more than two sulfonyl halide groups, for example an aromatic trisulfonyl halide, or an aromatic tetrasulfonyl halide.

A catalyst is not essential, but one can be used if desired, for example one of the catalysts employed for the arylation process described in British Pat. No. 959,605, essentially corresponding to copending U.S. application Ser. No. 226,433, filed Sept. 26, 1962, now U.S. Pat. 3,244,721. Copper and copper compounds, for example copper halides, are among the most effective catalysts. A catalyst is preferably used in an amount of from about 0.001 to about 0.1 mol per mol of the aromatic sulfonyl halide.

Especially preferred polymers produced according to the present invention are those prepared from benzene sulfonyl halides, in particular benzene-1,3-disulfonyl chloride, and polyphenyls, in particular terphenyls. For the production of a highly branched, crosslinked, insoluble, infusible resin from benzene-1,3-disulfonyl chloride and terphenyl starting materials, the preferred overall molar ratios of benzene-1,3-disulfonyl chloride to terphenyls are from 1.05:1 to 1.5:1, and more particularly from 1.1:1 to 1.4:1.

Preferably the process is carried out in two stages, during the first of which from 0.6 to 0.9 molar proportion of benzene-1,3-disulfonyl chloride are added gradually to 1 molar proportion of terphenyls to give an intermediate soluble, fusible prepolymer. The optimum period of addition may depend to some extent on the amounts of material involved, but is usually from 4 to 10 hours. The reaction mixture can optionally be held at the reaction temperature for a period after the addition of the benzene-disulfonyl chloride is complete. Under certain conditions of formation, the prepolymer may contain a proportion of unreacted terphenyl, and if desired, this can be removed, for example by distillation under reduced pressure. The prepolymer is a liquid or fusible solid and is soluble in such solvents as chloroform, dichloroethane, benzene, chlorobenzene, xylene and dimethylformamide and is especially useful as an impregnating resin, coating, etc., which may be further polymerized in situ to give an insoluble, infusible, final polymeric product.

In the second stage of the process, the prepolymer is mixed with the remainder of the benzene-1,3-disulfonyl chloride and the polymerization is continued. The final polymer is a highly branched, crosslinked, infusible, insoluble material.

The infusible polymers of this invention are particularly valuable as binding agents for use with fibrous reinforcing materials in the production of articles having high mechanical strengths. Where advantage is taken of the high thermal stabilities of the polymers and the article is intended for use at high temperatures, the reinforcing material used is one which is itself refractory, for example fibers from glass, asbestos, graphite, carbon, boron, refrasil, etc. The fibers used as reinforcing elements may be in the form of woven mats or in the form of oriented or unoriented chopped fibers.

Where the polymer is to be used as a binding agent in the production of a reinforced composite, the fibrous reinforcing agent, is usually introduced between the first and second stages, i.e., between the soluble, fusible intermediate prepolymer and the highly branched, crosslinked insoluble, infusible final polymer. The reinforcing agent is impregnated with a polymerizable mixture of prepolymer and an aromatic sulfonyl halide, preferably benzene disulfonyl halide usually as a solution in a suitable solvent to ensure adequate flow properties, and the composite then subjected to an elevated temperature at which conversion to the infusible form of the polymer occurs, after removal of solvent if necessary. Where a higher ratio of polymer to reinforcing agent is required than can be achieved by simple impregnation of the reinforcing agent, the second stage of the process can be carried out in a mould, or by impregnating the fibrous reinforcing element with a molten mixture of the prepolymer and aromatic sulfonyl halide.

The optimum temperature for the further polymerization in the presence of the reinforceing agent is often in the range 305° to 350° C. It is moreover advantageous, especially where the article to be produced has a laminated structure, to carry out this stage of the process in a press, preferably with intermittent venting of the gaseous byproducts. Pressures of for example from 25 to 2000 p.s.i., and preferably from 250 to 1000 p.s.i. can be used.

The mechanical strength of articles so produced is usually improved by further storage at an elevated temperature, during which the polymer undergoes "post-curing." The period of post-curing can be from, for example, 6 hours to 300 hours, and the temperature from 200 to 350° C. During post-cure, the temperature can be maintained substantially constant, or alternatively may be progressively increased or otherwise programmed. Typical post-cures are 168 hours at 275° C., or 72 hours at 275° C., then 24 hours at 300° C. followed by 24 hours at 325° C.

Reinforced polymer compositions of high mechanical strengths can be produced where the ratio of polymer to reinforcing agent varies over a relatively wide range. Preferably however, the composition should contain at least 20% by weight and not more than 80% by weight of reinforcing agent. The optimum content of reinforcing agent is often from 40% to 60% by weight.

The laminates may then be cut or machined into useful articles such as rocket nozzles, machine parts, structural components, etc., with excellent physical properties which will withstand elevated temperatures for long periods of time.

The following examples are set forth in illustration of the present invention and are not to be construed as limitation thereof. All parts and percentages are by weight unless otherwise indicated.

EXAMPLE 1

This example described the production of a soluble, fusible intermediate prepolymer having a molecular weight in the range of from 2000 to 2500, which is prepared from diphenyl ether-4,4'-disulfonyl chloride and bis(phenoxybiphenylyl) ether.

(a) Preparation of bis(phenoxybiphenylyl) ether

Bis(phenoxybiphenylyl) ether is first obtained from diphenyl ether and diphenyl ether-4,4'-disulfonyl chloride as follows:

A stirred mixture of 759.4 grams (4.46 mols) of diphenyl ether, 59.8 grams (0.1488 mol) of diphenyl ether-4,4'-disulfonyl chloride and 0.15 gram of cuprous chloride is heated in the range of from 250 to 260° C. under reflux in an atmosphere of nitrogen for 8 hours. Sulfur dioxide and hydrogen chloride are evolved, and at the end of the reaction period the amounts that have been produced are 97 percent and 94 percent of the theoretical quantities respectively.

Excess diphenyl ether is distilled from the reaction mixture under reduced pressure giving residual brown oil which is taken up in benzene. A small quantity of insoluble solid is removed by filtering the benzene solution and the benzene is evaporated from the filtrate to give a mixture of isomeric bis(phenoxybiphenyl) ethers as a semisolid.

The product is calculated for $C_{36}H_{26}O_3$.

Calculated (percent): carbon, 85.35; hydrogen, 5.17. Molecular wt., 506. Found (percent): carbon, 84.27; hydrogen, 5.02. Molecular wt., 497.

(b) Preparation of an intermediate polymer

In the prepolymer-forming reaction, a stirred mixture of 61 grams (0.13 mol) of the bis(phenoxybiphenyly) ethers and 47.5 grams (0.13 mol) of diphenyl ether-4,4'-disulfonyl chloride is heated under reflux at 260° C. for 5 hours. Sixty-five percent of the theoretical amount of hydrogen chloride and 62 percent of the theoretical amount of sulfur dioxide are evolved. The reaction product is dissolved in chloroform and this solution is added to methanol thereby precipitating the polymer as a fawn-colored powder. This is redissolved in chloroform and reprecipitated with methanol giving 75.9 grams (91.5 percent) of a polybiphenylene polyether having a softening point of 110° C. and a molecular weight of approximately 2000.

EXAMPLE 2

Example 1(b) is repeated here except that the condensation of the bis(phenoxybiphenylyl) ethers and diphenyl ether-4,4'-disulfonyl chloride is carried out in the presence of 1% of cuprous chloride catalyst based on the molar equivalent of the sulfonyl chloride.

The reaction temperature is maintained in the range of from 250 to 260° C. and heating is continued for 4 hours. The product after dissolving in chloroform and reprecipitating with methanol is obtained in 85 percent of the theoretical yield and has a softening point of 126° C. and a molecular weight of approximately 2300.

The following Examples 3 and 4 describe the further condensation of the intermediate prepolymer prepared in Examples 1 and 2 above with diphenyl ether-4,4'-disulfonyl chloride, and the use of these materials in the production of a reinforced laminate.

EXAMPLE 3

A mixture of 30.3 grams (0.015 mol) of the polybiphenylene polyether of molecular weight approximately 2000 which was prepared in Example 1, above, and 5.7 grams (0.015 mol) of diphenyl ether-4,4'-disulfonyl chloride are heated at 250° C. with stirring in a nitrogen atmosphere for 10 minutes. The reaction mixture is then dissolved in 130 cc. of chloroform and two-thirds of the solution are used to impregnate a 12-inch x 6-inch asbestos felt mat. The chloroform is evaporated by allowing the mat to stand at room temperature for 2 hours followed by heating in an oven at 75° C. for 1 hour. After a further period of storage at room temperature, the mat is cut into eight 3-inch squares. These are placed one on top of another and put in a press at 260° C. and a pressure of about 100 pounds per square inch (gauge). After 5 minutes, the pressure is released to allow gaseous products to escape. The pressure is then reapplied and heating at 260° C. is continued for 5 hours to yield a strong, hard laminate.

EXAMPLE 4

A solution of 20 grams (0.0087 mol) of the polybiphenylene polyether of molecular weight approximately 2300, which was prepared in Example 2, above, 3.2 grams (0.0087 mol) of diphenyl ether-4,4'-disulfonyl chloride and 0.008 gram of cuprous chloride in 90 cc. of chloroform is used to impregnate a 12-inch x 6-inch asbestos felt mat. The impregnated mat is stored overnight at room temperature during which time most of the chloroform evaporates, and the remainder is removed by heating in an oven at 85° C. for 1 hour. The mat is then cut into eight 3-inch squares. There were placed one one top of another, put in a press lined with copper, and heated for 5 hours at 250° C. under a pressure of 50 pounds per square inch (gauge) to yield a strong, hard laminate.

EXAMPLE 5

This example describes (a) the production of an intermediate polymer from diphenoxyterphenyl and benzene-1,3-disulfonyl chloride; (b) the further condensation of the intermediate polymer with benzene-1,3-disulfonyl chloride; and (c) the use of the intermediate polymer as an impregnating resin.

(a) A mixture of 16.9 grams (0.043 mol) of diphenoxyterphenyl (an isomeric mixture obtained by the reaction of diphenyl ether with benzene-1,3-disulfonyl chloride), 11.8 grams (0.043 mol) of benzene-1,3-disulfonyl chloride and 0.04 gram of cuprous chloride is stirred and heated in the range of from 250 to 260° C. for 5 hours in an atmosphere of nitrogen. Seventy-eight percent of the theoretical amount of hydrogen chloride and 91 percent of the theoretical amount of sulfur dioxide are evolved. After cooling, the product is dissolved in chloroform and the chloroform solution is poured into methanol, thereby precipitating a fawn-colored solid. This solid is redissolved in chloroform and reprecipitated with methanol, giving 16.2 grams (80 percent yield) of a polyterphenylene polyether having a softening point of 110° C. and a molecular weight of 1790.

(b) A mixture of 5 grams (0.0028 mol) of the polyterphenylene polyether prepared in (a) above, 0.77 gram (0.0028 mol) of benzene-1,3-disulfonyl chloride and 0.003 gram of cuprous chloride is stirred and heated in the range of from 250 to 260° C. for 5 hours in an atmosphere of nitrogen. Ninty-two percent of the theoretical amount of hydrogen chloride and 79 percent of the theoretical amount of sulfur dioxide are evolved. On cooling, the reaction mixture set to a brittle solid. This was crushed and digested for several hours with boiling chloroform. The chloroform-insoluble material (4.6 grams; 88.2 percent yield) is a hard brittle solid that did not soften on heating below 360° C. Evaporation of the chloroform extract gave 1.0 gram of a solid having a softening point of 85° C.

(c) A mixture of 10 grams (0.0056 mol) of the polyterphenylene polyether of molecular weight 1790, which was prepared in Part (a) above, 1.54 grams (0.0056 mol) of benzene-1,3-disulfonyl chloride and 0.0052 gram of cuprous chloride is stirred and heated in the range of from 250 to 260° C. under nitrogen for 10 minutes. Thirteen percent of the theoretical amount of hydrogen chloride and 10 percent of the theoretical amount of sulfur dioxide are evolved. The reaction mixture is then cooled and dissolved in chloroform. The solution is used to impregnate a 9-inch x 4-inch mat of asbestos fibers, which, after evaporation of the chloroform, was cut into six strips, each 4-inch x 1.5-inch. These strips are placed one on top of another and heated at 250° C. for 5 hours in a press at a gauge pressure of 50 pounds per square inch to yield a strong, hard laminate.

EXAMPLE 6

This example describes (a) the production of an intermediate polymer from diphenoxyquaterphenyl and biphenyl-4,4'-disulfonyl chloride and (b) the further condensation of the intermediate polymer with biphenyl-4,4'-disulfonyl chloride in the presence of an asbestos mat to yield a laminate.

(a) A mixture of 20.5 grams (0.0485 mol) of diphenoxyquaterphenyl (an isomeric mixture obtained by the reaction of diphenyl ether and biphenyl-4,4'-disulfonyl chloride), 17.2 grams (0.0485 mol) of biphenyl-4,4'-disulfonyl chloride and 0.048 gram of cuprous chloride is stirred and heated in the range of from 250 to 260° C. for 4 hours in an atmosphere of nitrogen. Sixty-three percent of the theoretical amount of hydrogen chloride and 76 percent of the theoretical amount of sulfur dioxide are evolved. After cooling, the product is dissolved (except for 0.13 gram of insoluble material) in chloroform, and the filtered chloroform solution is poured into methanol, thereby precipitating a fawn-colored solid. This solid is redissolved in chloroform and reprecipitated with methanol, giving 23.2 grams (83 percent yield) of a polyquaterphenylene polyether having a softening point of 162° C. and a molecular weight of 2600.

(b) An asbestos felt mat, 12-inch long x 6-inch wide is impregnated with a solution containing 20 grams (0.0077 mol) of the polyquaterphenylene polyether, 2.7 grams (0.0077 mol) of biphenyl-4,4'-disulfonyl chloride and 0.0076 gram of cuprous chloride in 90 cc. of chloroform. The mat is dried out and then cut into eight strips, each 4-inch x 1.5 inch. The eight strips are placed one on top of another and then heated at 250° C. for 5 hours in a press under a pressure of 50 pounds per square inch (gauge), giving a strong, hard laminate.

EXAMPLE 7

This example describes (a) the production of an intermediate polymer from bis-dibenzofuranyldiphenyl ether and diphenyl ether-4,4'-disulfonyl chloride, and (b) the further condensation of the intermediate polymer with diphenyl ether-4,4'-disulfonyl chloride.

(a) A mixture of 19.1 grams (0.0325 mol) of bis-dibenzofuranyldiphenyl ether (an isomeric mixture obtained by the reaction of dibenzofuran and diphenyl ether-4,4'-disulfonyl chloride), 11.95 grams (0.0325 mol) of diphenyl ether-4,5'-disulfonyl chloride, and 0.032 gram of cuprous chloride is stirred and heated in the range of from 250 to 260° C. in an atmosphere of nitrogen for 5 hours. The reaction mixture is dissolved (except for a small amount of insoluble material) in chloroform and the filtered chloroform solution is poured into methanol, thereby precipitating a brown solid. This solid is redissolved in chloroform and reprecipitated wth methanol giving 20.6 grams (83.5 percent yield) of a poly(phenoxyphenyldibenzofuran) having a softening point of 200° C. and a molecular weight of 2000.

(b) An asbestos felt mat, 12-inch long by 6-inch wide, is impregnated with a solution containing 19.4 grams (0.0097 mol) of the poly(phenoxyphenyldibenzofuran), 3.55 grams (0.0097 mol) of diphenyl ether-4,4'-disulfonyl chloride and 0.0096 gram of cuprous chloride in 90 cc. of chloroform. The mat is dried out and then cut into eight pieces, each 4-inch x 1.5-inch. These pieces are placed one on top of another and are then heated at 250 to 260° C. for 5 hours in a press under a pressure of 50 pounds per square inch (gauge), giving a very strong laminate.

EXAMPLE 8

This example illustrates (a) the preparation of a soluble, fusible polyphenyl prepolymer and (b) the use of the polyphenyl as the aromatic compound in the preparation of a laminate.

(a) An equimolar mixture of quinquephenyls (obtained by the reaction of benzene-1,3-disulfonyl chloride and biphenyl) and benzene-1,3-disulfonyl chloride containing a catalytic quantity of cuprous chloride is stirred and heated in the range of from 250 to 260° C. in an atmosphere of nitrogen until 80 percent of the theoretical amount of sulfur dioxide and 78 percent of the theoretical amount of hydrogen chloride has been evolved. The reaction mixture is treated as described in the previous example by twice dissolving in chloroform and precipitating with methanol to give a 92.5 percent yield of polyphenyls having a softening point of 172° C. and an average molecular weight of 1360.

(b) A mixture of 1 molar proportion of the polyphenyl prepared in (a) above, and 1.5 molar proportions of benzene-1,3-disulfonyl chloride containing a catalytic quantity of cuprous chloride is stirred and heated in an atmosphere of nitrogen for 25 minutes. During this time, 35 percent of the theoretical amount of hydrogen chloride and 30 percent of the theoretical amount of sulfur dioxide are evolved. The reaction mixture is then cooled and dissolved in chloroform, and the solution is used to impregnate an asbestos felt mat. A laminate is formed from superimposed sections of the mat by heating at 250° C. under a pressure of 300 p.s.i. (gauge) for 5 hours in a press and in an oven at 184° C. for 2 days. The flexural strength of the laminate measured at 200° C. is 10,300 p.s.i. After storage for a further 168 hours at 240° C., the flexural strength of the laminate measured at 200° C. is 17,000 p.s.i.

EXAMPLE 9

In this example a soluble, fusible polyphenyl prepolymer is prepared which is then used as the aromatic compound in the preparation of a laminate.

Polyphenyls having an average molecular weight of 1560 are obtained by the thermal condensation of equimolar quantities of septaphenyls and benzene-1,3-disulfonyl chloride in the presence of a catalytic quantity of cuprous chloride.

One molar proportion of the polyphenyls is then heated with 3 molar proportions of benzene-1,3-disulfonyl chloride in the presence of cuprous chloride as catalyst until 24 percent of the theoretical amount of hydrogen chloride has been evolved. After cooling, the intermediate polymer thus obtained is dissolved in chloroform, and the chloroform solution is used to impregnate an asbestos felt mat. A laminate is produced from superimposed sections of the mat by heating in a press for five hours at 250° C. and 300 p.s.i. (gauge) and by post-curing in an oven at 160° C. for 60 hours. The flexural strength of the laminate measured at room temperature is 18,100 p.s.i. After further post-curing for 24 hours at 200° C., the flexural strength of the laminate measured at room temperature is 23,000 p.s.i.

EXAMPLE 10

This example describes the preparation of a final soluble polymer and its use in the production of a laminate, without the isolation of any intermediate polymeric materials.

An equimolar mixture of isomeric terphenyls and benzene-1,3-disulfonyl chloride containing a catalytic quantity of cuprous chloride is heated at 250° C. in an atmosphere of nitrogen for 5 hours. During this time 77 percent of the theoretical amount of hydrogen chloride and 89.5 percent of the theoretical amount of sulfur dioxide are evolved. The reaction mixture is then cooled, and a further equimolar proportion (relative to the initial terphenyls) of benzene-1,3-disulfonyl chloride is added. The mixture is reheated to the reaction temperature for a further 20 minutes, cooled and then dissolved in chloroform. The chloroform solution is used to impregnate an asbestos felt mat from superimposed sections of which a laminate is formed by heating at 250° C. in a press at 450 p.s.i. (gauge) for 5 hours, and by heating in an oven at 220° C. for 48 hours.

The flexural strength of the laminate measured at 200° C. is 10,500 p.s.i. After reheating at 240° C. for a further 48 hours, the flexural strength at 200° C. has increased to 14,000 p.s.i., and after a further 72 hours at 240° C., to 14,700 p.s.i. Measured at room temperature, the final laminate has a flexural strength of 17,500 p.s.i.

EXAMPLE 11

This example describes a further method for the preparation of a final soluble polymer without the isolation of intermediate polymeric material and the use of the final soluble polymer in the production of a laminate.

A molten mixture of 10.2 grams of diphenyl ether and 55.4 grams (0.2 mol) of benzene-1,3-disulfonyl chloride is added during two hours to a stirred mixture of 24 grams of diphenyl ether (giving a total amount of 34.2 grams (0.2 mol) of this material) and 0.2 gram of cuprous chloride at a temperature in the range of from 250 to 260° C. After the addition was complete, the reactive mixture is heated for a further hour, when a total of 75.5 percent of the theoretical amount of hydrogen chloride and 89.5 percent of the theoretical amount of sulfur dioxide has been evolved.

When cool, the reaction mixture is dissolved in chloroform, and the solution is used to impregnate a 12" x 12" asbestos felt mat. The chloroform is allowed to evaporate and the mat is then cut into strips 4" x 3". Six such strips are placed one on top of another in a press at a temperature of 250° C. and are allowed to heat up for 10 minutes before a pressure of 450 p.s.i. (gauge) is applied. The pressure is temporarily released after 20 minutes to allow gas to escape, and is then reapplied for 4 hours 40 minutes. The laminate, which is post-cured by storage in an oven for 2 days at 240° C., has a high flexural strength.

EXAMPLE 12

The process described in Example 11 is repeated here using a higher molar ratio of benzene-1,3-disulfonyl chloride to diphenyl ether. The quantity of the disulfonyl chloride used is 66 grams (0.24 mol).

The assembly of six strips obtained from the impregnated asbestos mat is heated at 250° C. for 1 minute before applying a pressure of 450 p.s.i. (gauge). The pressure is released temporarily after 10 minutes heating and again after 20 minutes to allow the gaseous by-products to escape, and is then reapplied for 4 hours 40 minutes. The laminate, which is post-cured at 240° C. for 2 days, has a high flexural strength.

TABLE 1.—SUMMARY OF EXAMPLES 1 TO 12

| Ex. | Aromatic sulfonyl halide | Aromatic compound | Product |
|---|---|---|---|
| 1(a) | Diphenyl ether-4,4'-disulfonyl chloride | Diphenyl ether | Bis(phenoxyphenylyl)ether. |
| 1(b) | do | Bis(phenoxyphenylyl)ether | Soluble, fusible prepolymer. |
| 2 | do | do | Do. |
| 3 | do | Prepolymer from Example 1(b) | Resin impregnated laminate. |
| 4 | do | Prepolymer from Example 2 | Do. |
| 5(a) | Benzene-1,3-disulfonyl chloride | Diphenoxyterphenyl | Soluble, fusible prepolymer. |
| 5(b) | do | Prepolymer from Example 5(a) | Insoluble, infusible prepolymer. |
| 5(c) | do | do | Resin impregnated laminate. |
| 6(a) | Biphenyl-4,4'-disulfonyl chloride | Diphenoxyquaterphenyl | Soluble, fusible prepolymer. |
| 6(b) | do | Prepolymer from Example 6(a) | Resin impregnated laminate. |
| 7(a) | Diphenyl ether-4,4'-disulfonyl chloride | Bis-dibenzofuranyl diphenyl ether | Soluble, fusible prepolymer. |
| 7(b) | do | Prepolymer from Example 7(a) | Resin impregnated laminate. |
| 8(a) | Benzene-1,3-disulfonyl chloride | Quinquephenyl | Soluble, fusible polyphenyl prepolymer. |
| 8(b) | do | Polyphenyl from Example 8(a) | Resin impregnated laminate. |
| 9 | do | Polyphenyl | Do. |
| 10 | do | Isomeric terphenyls | Do. |
| 11 | do | Diphenyl ether | Do. |
| 12 | do | do | Do. |

The foregoing Table I summarizes the reactants used in Examples 1 to 12 and the resulting product obtained. The reaction processes of Examples 1(b) and 3 were conducted without a catalyst while the reaction processes in the remaining examples were conducted using a cuprous chloride catalyst. The laminates prepared in Examples 3 to 9 inclusive were prepared using a two-step process wherein a soluble, fusible prepolymer was first prepared and isolated. This prepolymer is subsequently used as the aromatic compound which is reacted with the aromatic sulfonyl halide in the preparation of the laminate. In Examples 10 to 12, inclusive, the resin impregnated laminate is prepared directly without first isolating a soluble, fusible prepolymer.

Mass spectrometric examination of the prepolymer samples prepared in the foregoing examples indicates a high degree of branching in the polymer structure. This branched structure is retained in the final crosslinked insoluble, infusible polymer. No attempt was made to determine the molecular weight of the final polymer because the concept of molecular weight cannot be significantly applied since there are no discrete molecules in the final crosslinked polymeric network.

The following examples are in further illustration of the present invention wherein the thermal condensation reaction is carried out at temperatures above 300° C.

EXAMPLE 13

This example describes the production of prepolymers from a mixture of isomeric terphenyls and benzene-1,3-disulfonyl chloride (abbreviated to B.D.S. in Table II below) in various molar ratios and at various reaction temperatures between 300 and 400° C.

In each case, the benzene disulfonyl chloride is added gradually to the terphenyls in a reaction vessel equipped with a stirrer, reflux condenser and gas inlet tube. A slow stream of nitrogen is led over the surface of the reactants, and the gas stream containing sulfur dioxide and hydrogen chloride is taken from the top of the reflux condenser through scrubbers containing sodium hydroxide solution. At the completion of the process, the scrubber contents are analyzed to determine the quantities of sulfur dioxide and hydrogen chloride that have been evolved. The product in each case is a fusible solid, substantially completely soluble in chloroform at room temperature.

(a) A prepolymer is prepared from benzene-1,3-disulfonyl chloride and a mixture of isomeric terphenyls as follows:

7700 grams (28 mols) of benzene-1,3-disulfonyl chloride are added at a substantially uniform rate to 9200 grams (40 mols) of terphenyls stirred at a temperature of 310° C. in a reactor equipped with a reflux condenser and gas inlet line. A slow stream of nitrogen is passed into the vessel; the sulfur dioxide and hydrogen chloride produced as by-products of the polymerization are entrained in the nitrogen and the gas mixture is led from the top of the reflux condenser into scrubbers containing sodium hydroxide solution. The addition of the benzene-1,3-disulfonyl chloride is complete in 8 hours 35 minutes, after which the mixture is held at 310° C. for one hour longer. Analysis of the scrubber liquors for sulphite and chloride showed that 98.7% of the theoretical quality of hydrogen chloride and 96.5% of the theoretical quantity of sulfur dioxide has been evolved. The molten product (11,050 grams) is poured onto trays where it sets to a brittle solid. This product (prepolymer A) has an average molecular weight of 841.

(b) 3010 grams of prepolymer A are transferred to a still and are melted, and heated under nitrogen at a pressure of 15–20 mm. of mercury to a pot temperature of 400° C. A quantity of terphenyl, equivalent to 17% of the initial charge, is distilled, giving a residue (prepolymer B) having an average molecular weight of 1870.

EXAMPLE 15

This example illustrates the preparation of a resin reinforced laminate using prepolymer A which is prepared in Example 14(a) as the impregnating resin.

A solution of 240 grams of prepolymer A prepared in Example 14 above and 119.5 grams of benzene-1,3-disulfonyl chloride (equivalent to an overall molar ratio of terphenyl to benzene disulfonyl chloride of 1:1.2) in 1500 cc. of chloroform is used to impregnate six 12" x 12" chrysotile asbestos felt mats having an initial total weight of 236 grams. The mats are drained and the solvent allowed to evaporate at room temperature. The weight of the mats plus non-volatile material retained is 560.6 grams.

The impregnated mats are then placed one on top of another in a press, a pressure of 54 tons was applied, and TABLE II.—SUMMARY OF EXAMPLES 13(a) TO 13(e)

| Example | Terphenyl/ B.D.S. ratio | Reaction temperature ° C. | Addition time (mins.) | Percent of theoretical yield | | Softening point of prepolymer ° C. |
|---|---|---|---|---|---|---|
| | | | | HCl | SO$_2$ | |
| 13(a) | 1:0.73 | 305 | 368 | 99 | 97 | 140–145 |
| 13(b) | 1:0.67 | 320 | 350 | 98.3 | 96.4 | 115–120 |
| 13(c) | 1:0.72 | 335 | 360 | 96.5 | 99 | 115–120 |
| 13(d) | 1:0.68 | 350 | 390 | 96.2 | 98.8 | 125–130 |
| 13(e) | 1:0.68 | 375 | 390 | 97.5 | 95.5 | 140–150 |

EXAMPLE 14

This example is set forth to illustrate (a) the preparation of a prepolymer using temperatures above 300° C. and (b) the removal of unreacted terphenyl monomer.

the press is heated to 125° C. for 10 minutes. The pressure is temporarily released and then reapplied at a value of 60 tons while the temperature is increased to 310° C. After 6 minutes at this temperature the pressure is released, then reapplied for 3 minutes, released, and so on for a total of three successive 3 minute periods. Thereafter the pressure and temperature are maintained constant to give a total pressing time of 5 hours. The laminate is then "post-cured" by storage in air at 275° C. for 168 hours. The weight of the post-cured laminate corresponds to a polymer content of 48.9%.

The initial flexural strength of the board at room temperature at 300° C. and the strengths after further storage at 300° C. are given in the following Table III, from which the high degree of thermal stability is apparent.

TABLE III.—FLEXURAL STRENGTH OF LAMINATE PREPARED IN EXAMPLE 15

| Hours at 300° C. | Flexural strength (p.s.i.) | | Weight loss (percent of original) |
| --- | --- | --- | --- |
| | Cold | At 300° C. | |
| 0 | 32,900 | 18,300 | *2.3 |
| 100 | 31,000 | 18,400 | 1.99 |
| 250 | 29,900 | 24,900 | 3.67 |
| 500 | 29,000 | 22,300 | 8.8 |

*During post-curing.

EXAMPLE 16

This example describes the production of a laminated reinforced resin sheet using prepolymer B which was prepared in Example 14(b). This material is polymerized further by heating with a further quantity of benzene-1,3-disulfonyl chloride.

A solution containing 247.5 grams of the prepolymer, 134.8 grams of benzene-1,3-disulfonyl chloride (equivalent to a molar ratio of terphenyl to total benzene-1,3-disulfonyl chloride of 1:1.45) and 0.66 gram of anhydrous cupric chloride in 1500 cc. of chloroform is used to impregnate six 12" x 12" asbestos felt mats having a total initial weight of 240 grams. A laminate is made from the mats by the same process as that described in Example 15. The weight of the post-cured laminate corresponds to a polymer content of 51.9%.

The initial flexural strengths of the laminate at room temperature and at 300° C. and the flexural strengths measured at intervals during storage in an air oven at 300° C. are set out in Table IV below. The high thermal stability of the laminate is apparent.

TABLE IV.—FLEXURAL STRENGTH OF LAMINATE PREPARED IN EXAMPLE 16

| Hours at 300° C. | Flexural strength (p.s.i.) | | Weight loss (percent of original) |
| --- | --- | --- | --- |
| | Cold | At 300° C. | |
| 0 | 35,500 | 26,900 | *1.0 |
| 100 | 31,000 | 27,900 | 3.0 |
| 250 | 27,800 | 22,700 | 8.0 |
| 500 | 21,300 | 17,700 | 13.5 |

*During post-curing.

EXAMPLE 17

Example 16 is repeated here except that the laminate is post-cured for 24 hours at 275° C., 24 hours at 300° C., and a final 24 hours at 325° C. The resulting laminate has strength and thermal stability comparable to that obtained in Example 16.

EXAMPLE 18

This example describes the production of an asbestos-reinforced board of resin produced by the further polymerization of a sample of prepolymer A of Example 13 with benzene-1,3,5-trisulfonyl chloride.

A solution containing 76.6 grams of the prepolymer and 34.6 grams of the benzene trisulfonyl chloride in 800 cc. of 1,2-dichloroethane is used to impregnate two 12" x 12" chrysotile asbestos felt mats. The solvent is allowed to evaporate and the mats are then cut into six 12" x 4" strips. These are placed one on top of another in a press at a temperature of 100° C. and subjected to a pressure of 33 tons for 10 minutes. The pressure is released temporarily and then reapplied at a value of 22 tons (1000 p.s.i.) while the temperature is increased to 310° C. After two minutes at this temperature the pressure is released, then reapplied for 3 minutes, released, and so on for a total of three successive 3 minute periods. Thereafter the temperature and pressure are maintained constant to give a total pressing time of 5 hours. The product is post-cured in air at 275° C. for 168 hours. Its weight corresponds to a polymer content of 49.9% and its initial flexural strength is 29,800 p.s.i. at room temperature and 20,300 p.s.i. at 300° C. These values are substantially unchanged after 100 hours at 300° C.

EXAMPLE 19

This example describes the production of a reinforced laminate by the further polymerization of a sample of prepolymer A, which was prepared in Example 14(a) above, with benzene-1,3-disulfonyl chloride in the presence of carbon fibers.

A solution of 5.75 grams of the prepolymer and 2.75 grams of the benzene disulfonyl chloride (equivalent to an overall ratio of terphenyl to benzene disulfonyl chloride of 1:1.2) in 50 cc. of benzene is used to impregnate a mat 3½" x 3" of carbon fibers weighing initially 2.1 grams. After draining and evaporation of the solvent, the mat is cut into six 3½" x ½" strips. These are placed one on top of another in a press at a temperature of 340° C. After 8 minutes, a pressure of 400 p.s.i. is applied for 3 minutes, released, reapplied and so on for a total of three successive 3 minute periods. Thereafter, the temperature and pressure are held constant for a total press time of 5 hours. The laminate is post-cured in air for 5 days at 275° C. followed by 1 day at 300° C. and 1 day at 325° C. The polymer content of the laminate is 48.1% by weight, and its flexural strength at room temperature is 75,600 p.s.i.

EXAMPLE 20

Example 19 is repeated here except using glass cloth instead of the carbon cloth used in Example 19. A comparable laminate is obtained.

EXAMPLE 21

Example 19 is repeated here and the resulting laminate is machined to form a rocket nozzle, which is rapidly pyrolyzed at 2000° K. in an induction-heated graphite crucible. An examination of the residue reveals that the residue is intact and the laminate and fabric structure are apparent. The residue, which still has considerable strength, underwent a weight loss of about 10%. The gases evolved during pyrolysis are more than 95% hydrogen.

This example further illustrates the excellent physical strength and high temperature resistance that is obtained with laminated and machined articles which are prepared in accordance with the practice of the present invention.

The soluble, fusible prepolymers prepared in the foregoing Examples 13 to 15 are characterized by a highly branched structure, as is evidenced by mass spectrometric examination. This branched structure is retained in the final crosslinked, insoluble, infusible products which are obtained in Examples 16 to 21.

The polymeric products of the present invention find wide use as coatings, impregnating resins, insulating resins, etc. These polymeric materials are of special value in those areas requiring polymeric materials with good physical strength and high resistance to oxidative thermal degradation.

As shown above, the resin impregnated laminates may be cut and machined into useful high temperature resistant parts for use in automotive aeronautical and aero-space applications. Alternately, the polymers can be formed in a mold to give molded parts and objects. In still other applications the laminates may be used as thermal insulation or as thermal barriers for ovens, furnaces, motors, etc.

The intermediate prepolymer can be modified with fillers, pigments, antioxidants, dyes, thermally stable resins;

etc. which are carried over into the final polymer structure.

The choice of these materials is wide and varied according to the final properties desired in the finished product. Generally, the choice should be such so as not to detract from the excellent physical properties or thermal stability of the polymers of the present invention.

What is claimed is:

1. A laminated article comprising a fibrous reinforcing element impregnated with a crosslinked, insoluble, infusible polyphenylene resin which polyphenylene resin is prepared by the thermal condensation of
   (1) an aromatic sulfonyl halide containing from 2 to 3 sulfonyl halide groups per molecule and at least one aromatic nucleus and
   (2) an aromatic compound having at least three replaceable hydrogens per molecule and at least one aromatic nucleus wherein the aromatic nuclei are selected from the group consisting of
   (A) carbocyclic aromatic nuclei selected from the group consisting of benzene, anthracene, naphthalene, biphenyl and binaphthyl;
   (B) heterocyclic aromatic nuclei selected from the group consisting of dibenzofuran and dibenzothiophene; and
   (C) bridged aromatic nuclei of the following general formula

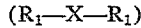

wherein $R_1$ is selected from groups (A) and (B) above and wherein X is a divalent linking radical selected from the group consisting of

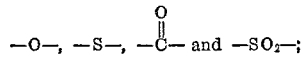

wherein the number of mols of the aromatic compound in the final polymeric product is not more than the number of mols of sulfonyl halide groups in the aromatic sulfonyl halide; and wherein the thermal condensation reaction is carried out at a temperature in the range of from 175° C. to 475° C. with the evolution of sulfur dioxide and hydrogen halide.

2. A laminated article as in claim 1 wherein the fibrous reinforcing element is fibrous carbon.

3. A laminated article as in claim 1 wherein the fibrous reinforcing element is an asbestos mat.

4. A laminated article as in claim 1 wherein the aromatic sulfonyl halide is benzene sulfonyl halide.

5. A laminated article as in claim 1 wherein the aromatic compound is a terphenyl.

6. A laminated article comprising a fibrous reinforcing element impregnated with a crosslinked, insoluble, infusible polyphenylene resin which polyphenylene resin is prepared by the thermal condensation of benzene disulfonyl chloride and terphenyl wherein the overall molar ratio of benzene disulfonyl chloride to terphenyl used in the condensation reaction is from 1.05:1 to 1.5:1 and wherein the thermal condensation polymerization reaction is carried out at a temperature in the range of from 175° C. to 475° C. with the evolution of sulfur dioxide and hydrogen chloride.

7. A laminated article as in claim 6 wherein the fibrous reinforcing element is fibrous carbon.

8. A laminated article as in claim 6 wherein the fibrous reinforcing element is an asbestos mat.

References Cited

UNITED STATES PATENTS

| | | | |
|---|---|---|---|
| 3,320,183 | 5/1967 | Brown | 260—2 H |
| 3,444,144 | 5/1969 | Neale et al. | 260—70.4 R |
| 3,575,914 | 4/1971 | Long et al. | 161—205 X |
| 3,582,498 | 6/1971 | Bilow et al. | 260—79.3 R X |
| 3,579,475 | 5/1971 | Jones et al. | 260—79.3 R X |

FOREIGN PATENTS

| | | | |
|---|---|---|---|
| 1,049,715 | 11/1966 | Great Britain. | |
| 1,107,255 | 3/1968 | Great Britain | 260—79.3 R |
| 1,034,752 | 7/1966 | Great Britain | 260—2 H |

GEORGE F. LESMES, Primary Examiner

W. R. DIXON, Jr., Assistant Examiner

U.S. Cl. X.R.

161—182, 192; 117—126 AB; 260—79.3 R, 2 R, 47 R, 63 R